US006328649B1

(12) United States Patent
Randall et al.

(10) Patent No.: US 6,328,649 B1
(45) Date of Patent: Dec. 11, 2001

(54) GAMING DEVICE HAVING MULTIPLE AWARD ENHANCING LEVELS

(75) Inventors: Dov L. Randall, Whitefield; Peter Gerrard, Prestwich, both of (GB)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 09/626,720

(22) Filed: Jul. 27, 2000

(51) Int. Cl.[7] .................................................... A63F 13/00
(52) U.S. Cl. ..................... 463/20; 273/138.1; 273/143 R
(58) Field of Search ..................... 463/16–21; 273/138.1, 273/139, 142 R, 143 R, 143 A, 142 B, 142 D, 138 A

(56) References Cited

U.S. PATENT DOCUMENTS

| | | | | |
|---|---|---|---|---|
| 4,624,459 | | 11/1986 | Kaufman | 273/143 R |
| 4,991,848 | | 2/1991 | Greenwood et al. | 273/143 R |
| 5,342,047 | | 8/1994 | Heidel et al. | 273/85 P |
| 5,456,465 | | 10/1995 | Durham | 273/138 A |
| 5,823,874 | | 10/1998 | Adams | 463/17 |
| 5,848,932 | | 12/1998 | Adams | 463/20 |
| 5,882,261 | | 3/1999 | Adams | 463/20 |
| 5,980,384 | | 11/1999 | Barrie | 463/16 |
| 5,997,400 | | 12/1999 | Seelig et al. | 463/6 |
| 6,004,207 | | 12/1999 | Wilson, Jr. et al. | 463/20 |
| 6,089,977 | * | 7/2000 | Bennett | 463/20 |
| 6,089,978 | | 7/2000 | Adams | 463/20 |
| 6,117,009 | * | 9/2000 | Yoseloff | 463/20 |
| 6,142,873 | * | 11/2000 | Weiss et al. | 463/20 |
| 6,149,521 | * | 11/2000 | Sanduski | 463/13 |

FOREIGN PATENT DOCUMENTS

| | | | |
|---|---|---|---|
| 0688002 A1 | 12/1995 | (EP) | G07F/17/32 |
| 0874337 A1 | 10/1998 | (EP) | G07F/17/32 |
| 0926645 A2 | 6/1999 | (EP) | G07F/17/32 |
| 0 945 837 A2 | 9/1999 | (EP) | G07F/17/32 |
| 0944030 A2 | 9/1999 | (EP) | G07F/17/34 |
| WO 0012186 | 3/2000 | (WO) | A63F/13/00 |

OTHER PUBLICATIONS

X Factor Brochure and Website Page published by WMS Gaming, Inc. in 1998.

American Thunder Screen Shots published by IGT in 1998.

Top Dollar Brochure published by IGT in 1998.

Polly & Roger Brochure published by VLC, Inc. in 2000.

Top Cat Brochure published by WMS Gaming, Inc.

Treasure Tunnel, Treasure Wheel Brochure published by Sigma Game, Inc.

Bonus Times published by Bally Gaming in 2000.

* cited by examiner

*Primary Examiner*—Michael O'Neill
*Assistant Examiner*—Scott E. Jones
(74) *Attorney, Agent, or Firm*—Bell, Boyd & Lloyd LLC

(57) ABSTRACT

The present invention provides an interactive, ongoing bonus game that operates at the same time as a base game of a gaming device and thereby enhances a player's award. The present invention provides one or more graduating multiplier or modifier displays, wherein the displays designate a position of value for each modifier. When certain symbols or combinations of symbols appear on the reels of the gaming device, the present invention modifies either the player's base game wager or a base game payout by the designated value of one of the modifiers. When certain other symbols or combinations of symbols appear on the reels of the gaming device, the present invention increases the designated value position for one or more of the modifiers.

38 Claims, 7 Drawing Sheets

GAMING DEVICE HAVING MULTIPLE AWARD ENHANCING LEVELS

CROSS-REFERENCE TO RELATED APPLICATIONS

This application is related to the following commonly-owned co-pending patent applications: “GAMING DEVICE HAVING SEPARATELY CHANGEABLE VALUE AND MODIFIER BONUS SCHEME,” Ser. No. 09/626,045; and “GAMING DEVICE HAVING SELECTIVELY ACCESSIBLE BONUS SCHEME,” Ser. No. 09/657,916.

COPYRIGHT NOTICE

A portion of the disclosure of this patent document contains material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device having multiple award enhancing levels.

BACKGROUND OF THE INVENTION

The popularity of a gaming device depends in part upon the level of enjoyment and excitement that the game provides to its players. Gaming device manufacturers constantly strive to make gaming devices that provide as much enjoyment and excitement as possible. Providing a bonus round in which a player has an opportunity to win potentially large awards or credits in addition to the awards associated with the base game of the gaming device is one way to enhance player enjoyment and excitement.

Known gaming devices having bonus rounds employ a triggering event that occurs during the base game operation of the gaming device. The triggering event temporarily stalls or halts the base game play and enables a player to enter a second, different game, which is the bonus game. The player plays the bonus game to its fruition, likely receives an award, and returns to the base game. In most instances, the bonus game or round is relatively short in relation to the time that the player spends playing the base game. The player may play the bonus game or round a number of times while playing the base game of the gaming device.

An example of the bonus game or round just described is the TOP DOLLAR™ game, which is manufactured and distributed by IGT, the assignee of this application. In the TOP DOLLAR™ game, the player plays a primary game until reaching the bonus round, which occurs when a combination of the reels of the gaming device matches a combination programmed into the controller of the gaming device. The player enters the bonus round, plays the bonus round to its fruition and then returns to the normal or base game of the gaming device. There is no limit to the amount of times that the player can enter the bonus round.

Another example of the above described bonus game or round is disclosed in European Patent Application No. EP 0 945 837 A2 filed on Mar. 18, 1999 and assigned on its face to WMS Gaming, Inc. Here, the device operates in a basic game until a “start bonus” event occurs, which causes the device to shift to a bonus game. The player plays the bonus game by selecting and uncovering awards until the player selects and uncovers a bonus round terminator, at which point the bonus round ends and the player returns to the base game.

In both of the examples, the gaming device randomly determines when the bonus round begins by incorporating certain symbols or combinations of symbols into the reels or random generation mechanism of the base game. Thus, while the player is playing the base game, the player desires to obtain symbols or combinations thereof that yield base game awards. The player also desires to obtain the symbols or combinations thereof that enable the player to enter the bonus game or round.

It should be appreciated that but for the symbols that the base game generates to enable the player to enter the bonus round, known bonus games or rounds are relatively independent of, and have little interaction with, the base game. The European Patent Application No. EP 0 945 837 discloses a “bonus resource” that a player obtains during the base game, which the player can thereafter apply during the bonus round. However, the level of interaction between the base game and the bonus game is limited to the function assigned to the bonus resource, such as overriding an event that would otherwise end the bonus round.

Other known games include bonus rounds which are generally self-contained and do not interact with the base game. Such bonus rounds award the player an additional award and then end. A particular bonus round has no further affect on the outcome of the base game or upon the outcome of a future bonus round. It is thus desirable to create a bonus scheme or additional game that is separate and apart from the base game, but that operates along side or in conjunction with the base game. It is also desirable to have such a game that is separable from the base game, but that is on-going rather than self-contained. Providing an ongoing and interactive bonus or additional game increases enjoyment and excitement because the player, in essence, plays two games wherein the player can be successful at either.

SUMMARY OF THE INVENTION

The present invention overcomes the above shortcomings by providing an interactive, continuous bonus game that operates in conjunction with the base game of the gaming device and enhances the player’s award. The game of the present invention provides and displays a plurality of graduating modifiers (preferably multipliers) and designates or highlights one of the modifiers. When one or more activating symbols appear on the payline of the reels, the game uses the designated or highlighted modifier to change (preferably increase) the player’s award. The present invention contemplates providing any number of modifiers, each of which have a value and a function or action, and changing the modifiers based on one or more triggering events.

More specifically, the player plays the base game of the gaming device, which involves spinning a set of reels and randomly producing and displaying a plurality of symbols on at least one payline. Certain symbols or sets of symbols predetermined and preprogrammed into the controller of the gaming device invoke or activate one or more of the modifiers. Each modifier has an associated activator, which is a symbol or set of symbols.

The activators activate the modifiers, which modify or operate upon a number of base game credits. The present invention contemplates two different modifiable groupings or numbers of base game credits. The first number of base game credits that the present invention contemplates modifying is the player’s base game wager. That is, the present invention multiplies or modifies the player's wager (which is normally a number of credits) by the activated modifier.

The second number of base game credits that the present invention contemplates modifying is a payout from a base game award. When the player spins the reels, the symbols generated alone or in combination may produce a base game award for the player. When this happens, and the player also generates an activator, the present invention enhances or increases the award by modifying the award by the designated modifier associated with the activator.

The modifiers preferably have a value and a function or action. The value is typically a number while the function or action can be one of many things desired by the implementor. The modifiers can multiply, add or perform any other mathematical function to the number of base game credits, such as squaring them. The modifier can also perform other functions such as choosing a number of picks that the player will have from a later group of award producing selections.

After the present invention modifies a number of base game credits, the present invention resets itself by generating or designating at least one new modifier. This auto-regeneration is preferably weighted so that the lowest modifier is not always designated and so that the highest modifiers are rarely designated. The higher value modifier provides an incentive, which provides excitement and enjoyment and motivates the players to play or continue playing the gaming device to achieve an enhanced payout.

The game also changes the highlighted or designated modifiers to modifiers having higher values. The reels of the present invention contain incrementor symbols or combinations. When a player receives an incrementor symbol or combination of symbols, the present invention changes the designated modifiers and displays the new modifiers in a modifier display. The present invention preferably increases the modifiers until the player wins or the highest valued modifier is designated, at which point the incrementors have no effect. The incrementors preferably change or reassign more than one or all the modifiers simultaneously, however, an incrementor can change only one modifier.

It is therefore an object of the present invention to provide a gaming device with a bonus game that operates in conjunction with the base game of the gaming device.

Another object of the present invention is to provide a bonus game that is on-going rather than self-contained, and which increases the player's award as the player continues to play the gaming device.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1:
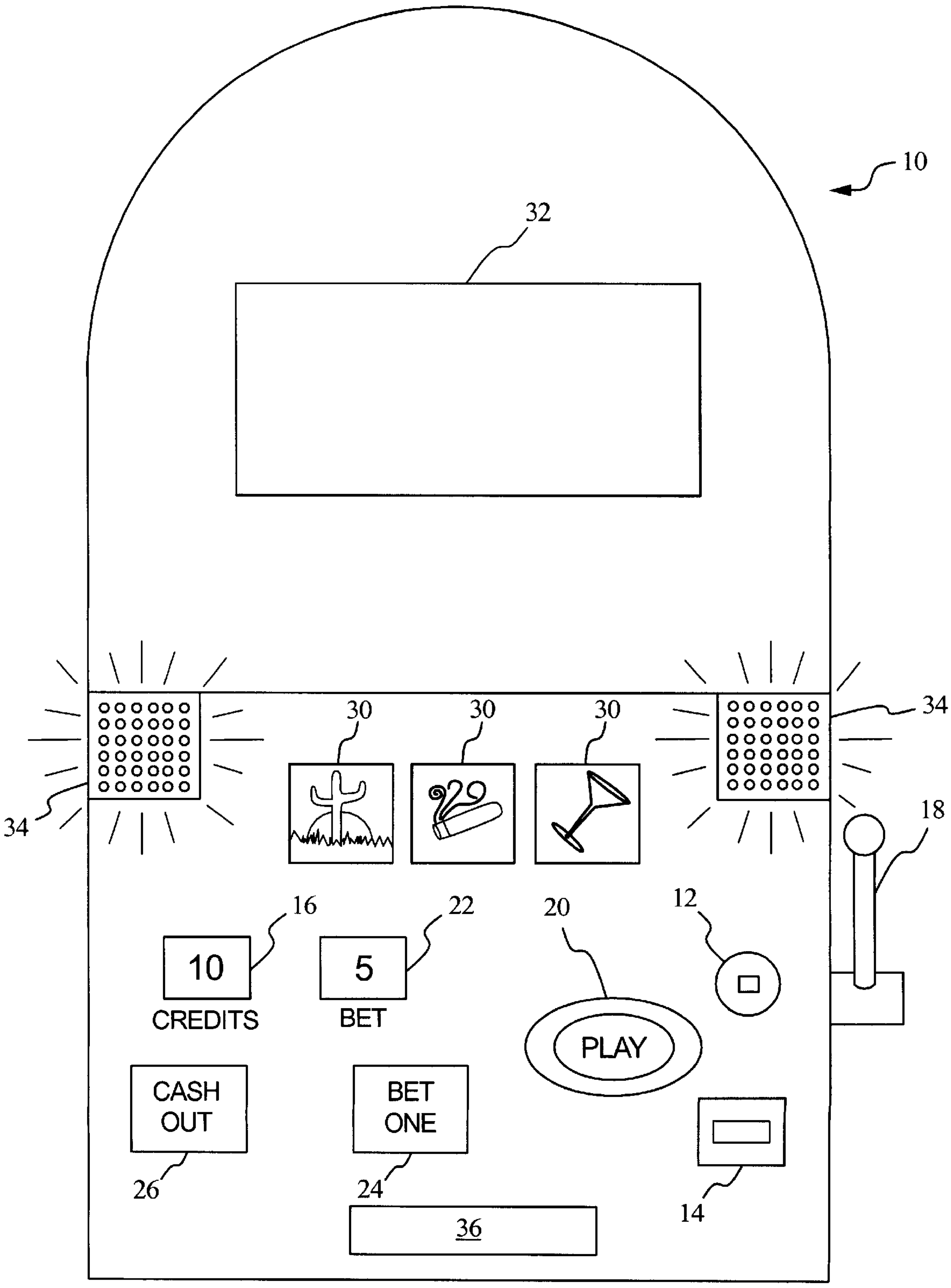
FIG. 1 is a front elevation view of one embodiment of the gaming device of the present invention.

Referring now to the drawings, FIG. 1 generally illustrates a gaming device 10 of one embodiment of the present invention, which is preferably a slot machine having the controls, displays and features of a conventional slot machine. Gaming device 10 is constructed so that a player can operate gaming device 10 while standing or sitting. However, it should be appreciated that gaming device 10 can be constructed as a pub-style table-top game (not shown) which a player can operate preferably while sifting. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any game such as slot, poker or keno in addition to any of their bonus triggering events which trigger the bonus game of the present invention. The symbols and indicia used on and in gaming device 10 may be in mechanical, electrical or video form.

As illustrated in FIG. 1, gaming device 10 includes a coin slot 12 and bill acceptor 14 where the player inserts money, coins or tokens. The player can place coins in the coin slot 12 or paper money in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling the arm 18, or pushing play button 20. Play button 20 can be any play activator used by the player which starts any game or sequence of events in the gaming device.

As shown in FIG. 1, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

Gaming device 10 also has a paystop display 28 which displays at least one symbol from a plurality of reels 30. Gaming device 10 preferably contains three to five reels in mechanical or video form. Each reel 30 contains a plurality of symbols such as bells, hearts, fruits, numbers, letters, bars or other images preferably corresponding to a theme of the gaming device 10. If the reels 30 are in video form, the gaming device 10 preferably displays the video reels 30 on the video monitor 32 instead of on the paystop display 28. The paystop display 28 of FIG. 1 displays only one row of symbols or payline. Gaming device 10 can display multiple rows of symbols and thus multiple paylines. A payline is a plurality of paystops displayed on the paystop display 28 that are analyzed by the controller of the present invention to determine if a player has generated a winning symbol or symbols. Gaming device 10 preferably also includes speakers 34 for making sounds or playing music.

At any time during the game, a player may "cash out" and thereby receive a number of coins corresponding to the number of remaining credits by pushing a cash out button 26. When the player "cashes out," the player receives the coins in a coin payout tray 36. The gaming device 10 may employ other payout mechanisms such as credit slips redeemable by a cashier or electronically recordable cards which keep track of the player's credits.

Figure 2:
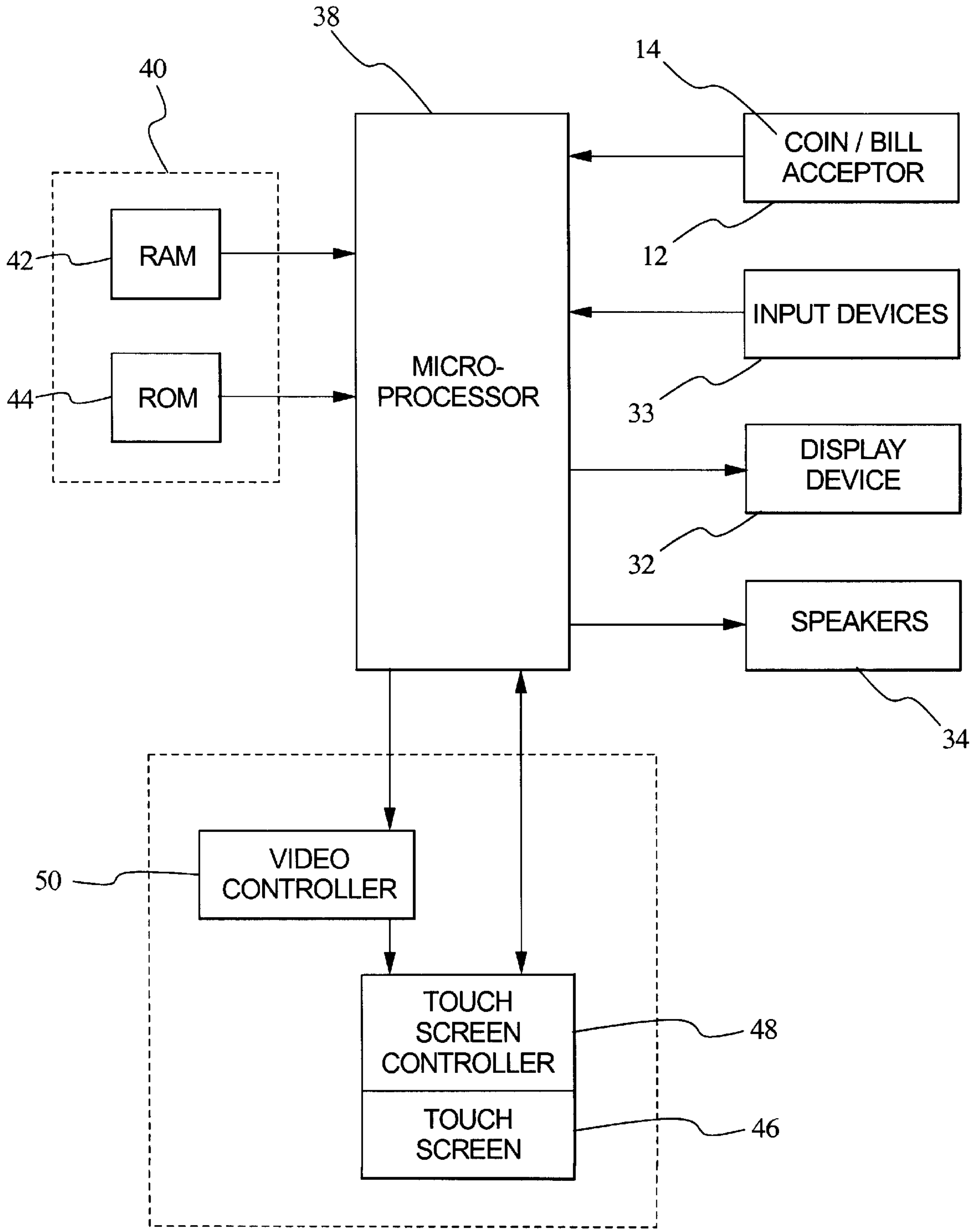
FIG. 2 is a schematic block diagram of the electronic configuration of one embodiment of the gaming device of the present invention.

With respect to electronics, gaming device 10 preferably includes the electronic configuration generally illustrated in FIG. 2, which has: a processor 38; a memory device 40 for storing program code or other data; a video monitor 32 or other display device (i.e., a liquid crystal display); a plurality of speakers 34; and at least one input device as indicated by block 33 such as the arm 18, play button 20, the bet one button 24 and the cash out button 26. The processor 38 is preferably a microprocessor or micro-controller-based platform which is capable of displaying images, symbols and other indicia such as images of people, characters, places, things and faces of cards. The memory device 40 can include random access memory (RAM) 42 for storing event data or other data generated or used during a particular game. The memory device 40 can also include read only memory (ROM) 44 for storing program code which controls the gaming device 10 so that it plays a particular game in accordance with applicable game rules and pay tables.

As illustrated in FIG. 2, the player preferably uses input devices 33 such as the arm 18, play button 20 or bet one button 24 to input signals into gaming device 10. The present invention can also provide a touch screen 46 and an associated touch screen controller 48 instead of a conventional video monitor 32. Touch screen 46 and touch screen controller 48 are connected to a video controller 50 and processor 38. A player can make decisions and input signals into the gaming device 10 by touching touch screen 46 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 are generally referred to herein as the "computer."

With reference to FIGS. 1 and 2, to operate the gaming device 10, the player must insert the appropriate amount of money or tokens at coin slot 12 or bill acceptor 14 and then pull the arm 18 or push the play button 20. The reels 30 will then begin to spin. Eventually, the reels 30 will come to a stop. As long as the player has credits remaining, the player can spin the reels 30 again. Depending upon where the reels 30 stop, the player may or may not win additional credits.

Bonus Game Scheme

Figure 3:
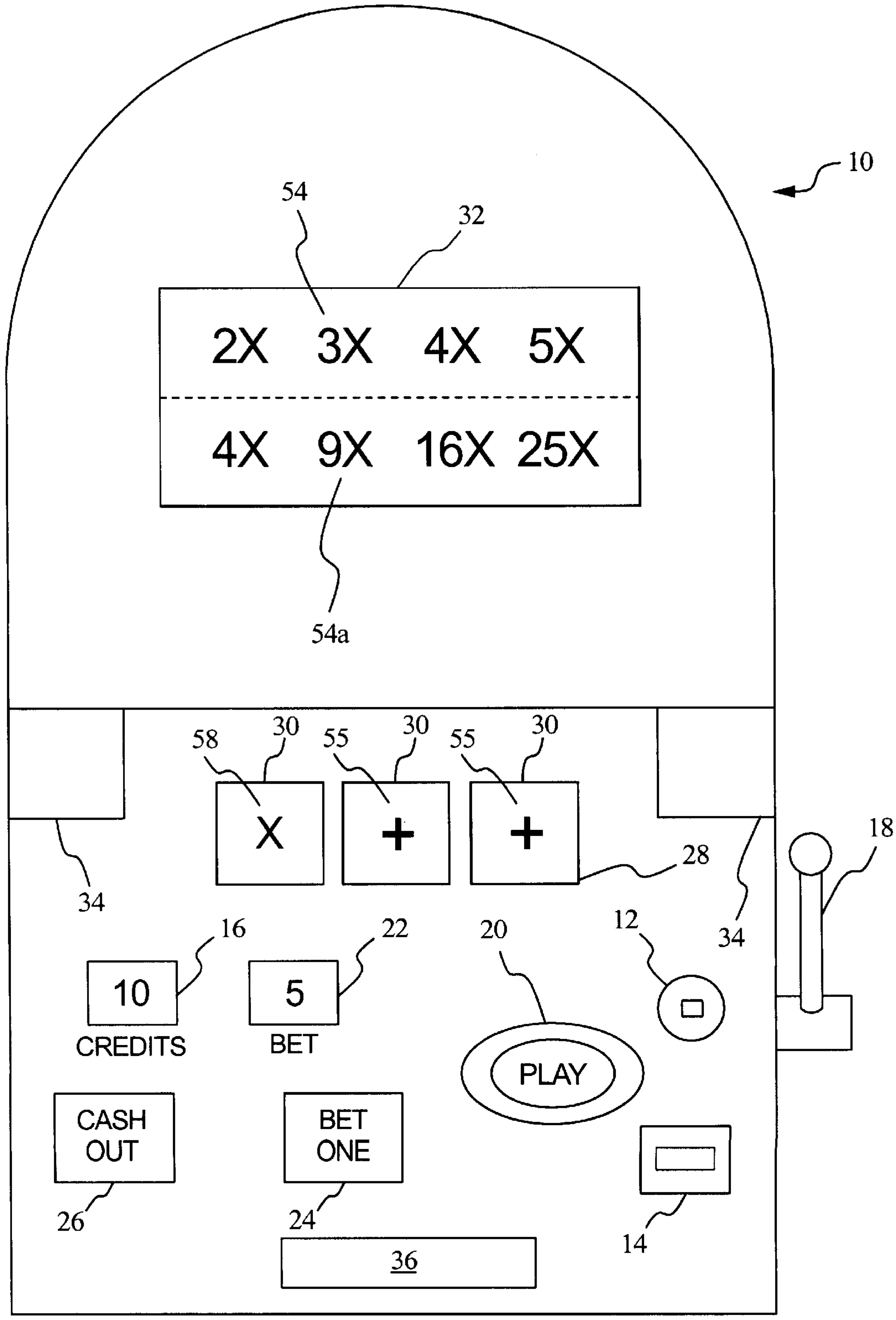
FIG. 3 is a front elevation view of a general embodiment of the present invention containing the general elements of the present invention.

Referring now to FIG. 3, a general embodiment of the present invention is shown containing the general elements of the present invention. The gaming device has a paystop display 28 having a plurality of reels 30 forming one or more paylines, a separate video monitor 32 and preferably a touch screen 46 (FIG. 2). The modifiers are shown generally by the numbers 54 and 54*a,* wherein there are two groups or sets of modifiers identified by the numbers 54 and 54*a*. The group 54 contains the modifiers 2x, 3x, 4x and 5x. The group 54*a* contains the modifiers 4x, 9x, 16x, and 25x. The present invention contemplates providing one set or group of modifiers (e.g. only group 54) or providing a plurality of such groups (e.g. groups 54 and 54*a*). If the present invention provides more than one group, the groups can be related by a mathematical function, e.g., group 54*a* is the mathematical square of group 54. The gaming device 10 designates or highlights one of the modifiers from each of the groups 54 and 54*a*. The present invention contemplates lighting the designated modifier or employing any suitable method of communicating the designation to the player.

The modifiers of groups 54 and 54*a* modify a number of base game credits. In FIG. 3, the modifiers can modify the 10 credits shown in the credit display 16. In other embodiments, the modifiers can modify an award generated by the reels 30 in the paystop display 28. The modifiers of groups 54 and 54*a* modify the base game credits, discussed in detail below, when the player receives an activator, such as the "X" activator 58 on a payline of the paystop display 28. That is, after spinning the reels and receiving the "X" activator 58 on a payline, the game modifies the base game credits by one of the currently designated modifiers from the groups 54 and 54*a*.

The gaming device 10 designates new modifiers when the player receives an incrementor, such as the "+" "+" incrementor 55 on a payline of the paystop display 28. The incrementor as well as the activator can be one symbol from a reel 30 or a combination of symbols from more than one reel 30. The incrementors change the designated modifier, preferably increasing the modifier value and preferably still, increasing the modifier value to the next highest modifier. If a player thus receives the "+" "+" incrementor 55 on a payline, the gaming device 10 preferably increases, for example, the modifier of group 54 from 2X to 3X or the modifier from the group 54*a* from 16X to 25X. As discussed below, the receipt of an incrementor can increase modifiers from one or a plurality of modifier groups. Further, the game can maintain the designated modifiers at the same relative position for two or more groups (e.g. 2x and 4x) or at different relative positions (e.g. 2x and 25x). It should be appreciated that if the designated modifier is already at the highest position, i.e., 5x or 25x, the receipt of an incrementor has no effect.

Modifiers

Figure 4:
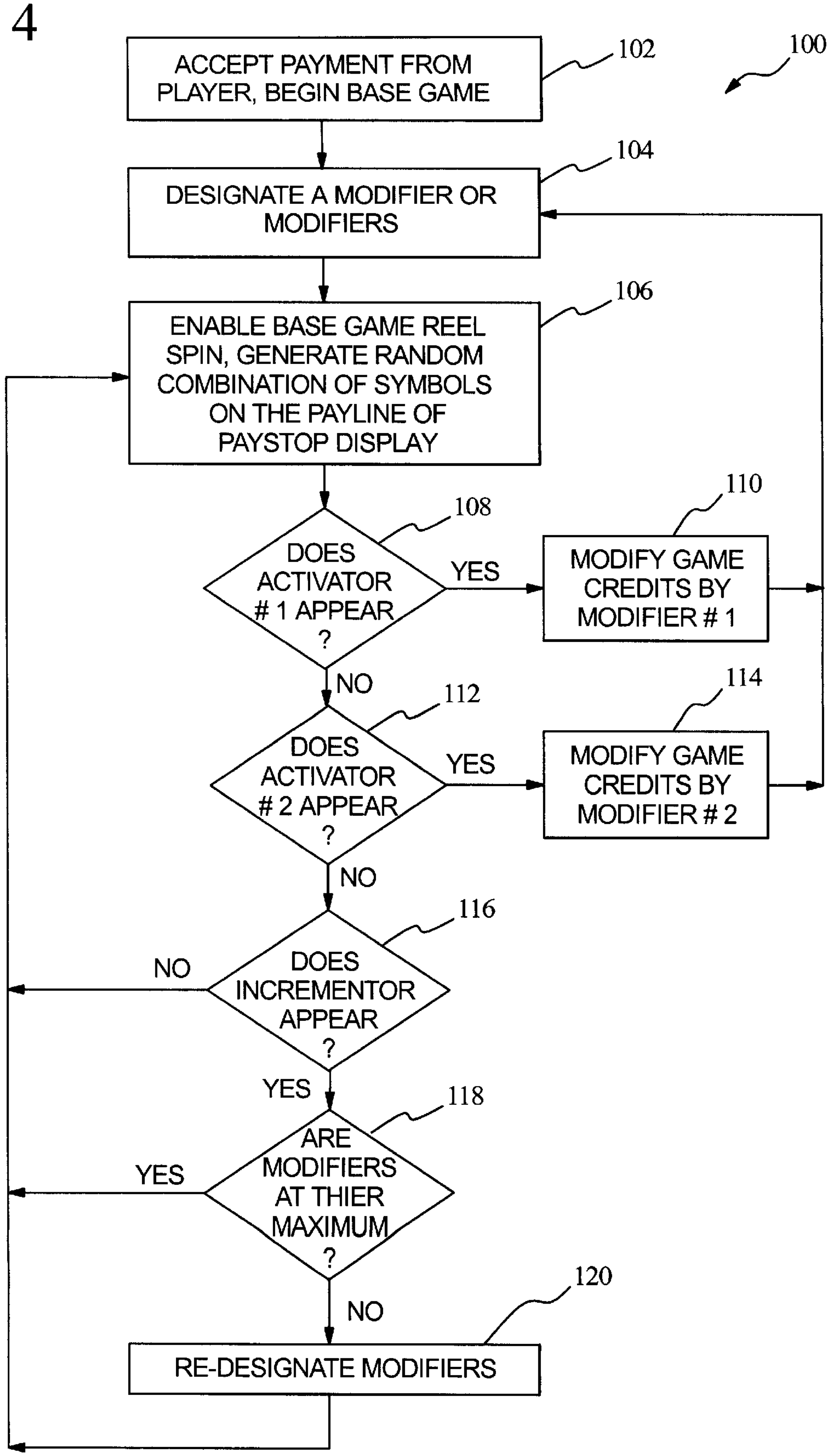
FIG. 4 is a flow diagram of one embodiment of the present invention.

Referring now to FIG. 4, a flowchart of the bonus game sequence of the present invention, generally indicated by the number 100, is shown wherein the present invention modifies, augments and provides an ongoing game separable from the base game of the gaming device. As shown by block 102, the first step of the bonus game is also the first step of the base game, i.e., the gaming device must receive money, coins or tokens from the player or issue credit to the player, at which time the gaming device enables the player to play the base game.

The present invention at all times designates a modifier or modifiers as indicated by block 104. When the player inserts money into the gaming device, the player preferably begins play with the modifier or modifiers that remain from the previous player. That is, when a player stops playing the gaming device of the present invention, the game preferably does not change the designated modifiers before another player arrives. The present invention likewise maintains the designated modifiers after a player begins play until the modifiers are activated or changed as described below.

Figure 5:
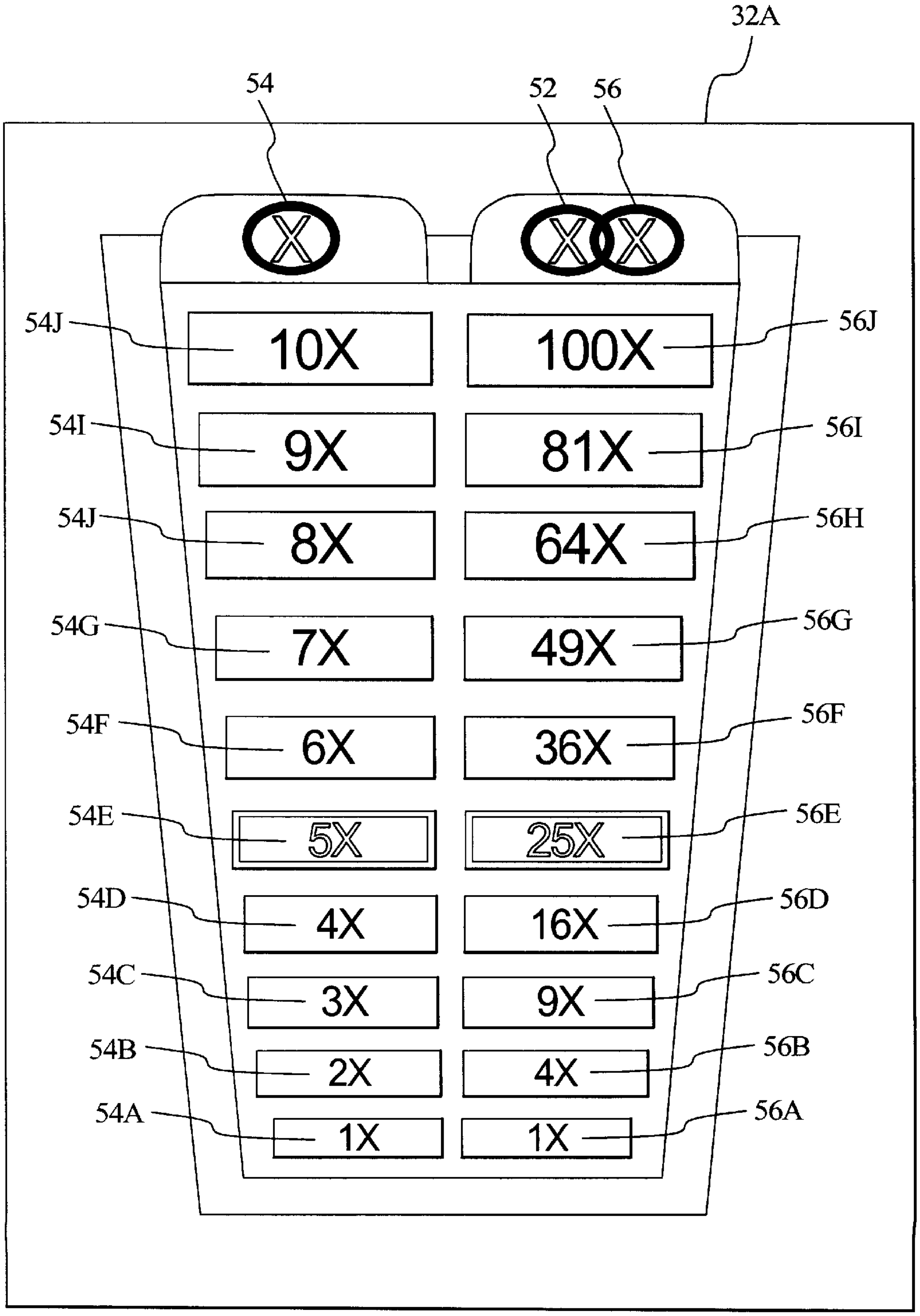
FIG. 5 is an enlarged front elevation view of the display of the gaming device that illustrates the modifiers of one embodiment of the present invention.

Referring also to FIG. 5, one embodiment of the present invention includes the modifiers illustrated in a modifier display 32*a* with a game show type device 52. The modifier display 32*a* designates modifiers from two modifier groups, the "X" modifier group 54 (as with FIG. 3) and the "XX" modifier group 56. The present invention contemplates designating one modifier, two modifiers, as shown here, or designating any number of modifiers as desired by the implementor. The device 52 and surrounding indicia are not essential to the invention and merely provide a theme in which to illustrate the modifiers and their associated values and functions. The present invention can employ any suitable illustration.

Referring still to FIG. 5, the modifier groups 54 and 56 of the present embodiment each preferably include a plurality of modifiers and one designated modifier. The modifiers of groups 54 and 56 both multiply base game credits and are mathematically related. The present invention can, however, provide modifier groups having no functional or mathematical relationship. That is, different modifier groups could multiply, add, square, etc. Moreover, modifiers in the same group can have no functional or mathematical relationship to other modifiers in the same group.

In FIG. 5, the "X" modifier group 54 contains the modifiers 54*a* through 54*j* having values 1 to 10, respectively. The "XX" modifier group 56 contains the modifiers 56*a* through 56*j* having values 1 to 100, respectively. Each group has ten modifiers wherein each "XX" modifier is a mathematical square of an "X" modifier. It should be appreciated that the present invention contemplates providing any number of modifier groups having any number of modifiers, each modifier having any value, and wherein the values of one modifier can have or not have a predetermined mathematical relationship to the values of another modifier.

Each modifier has a function, and different modifiers can have different functions. As alluded to by the symbols "X" and "XX," the modifiers can act as multipliers. That is, the gaming device 10 multiplies the appropriate number of base game credits to determine the player's award as described below. The present invention also contemplates the modifiers adding to the number of base game credits. The present invention contemplates the modifiers functioning in any way that can increase or aid the increase of the player's award. For example, the modifiers can function as to define a number of turns, tries, or picks that a player has at an award generating means such as a group of award selections.

Referring again to FIGS. 4 and 5, the present invention designates modifiers for each modifier group as indicated by block 104. In the embodiment of FIG. 5, the present invention designates one of the "X" modifiers, 54*a* through 54*j*, and displays the designation to the player. The present invention also designates one of the "XX" modifiers, 56*a* through 56*j*, to the player. In the embodiment of FIG. 5, the gaming device designates the modifiers in both groups at the same relative value or level (e.g., 5X and 25X); however, it should be appreciated that the present invention can designate modifiers having different relative values (e.g., 5X and 36X).

Figure 6:
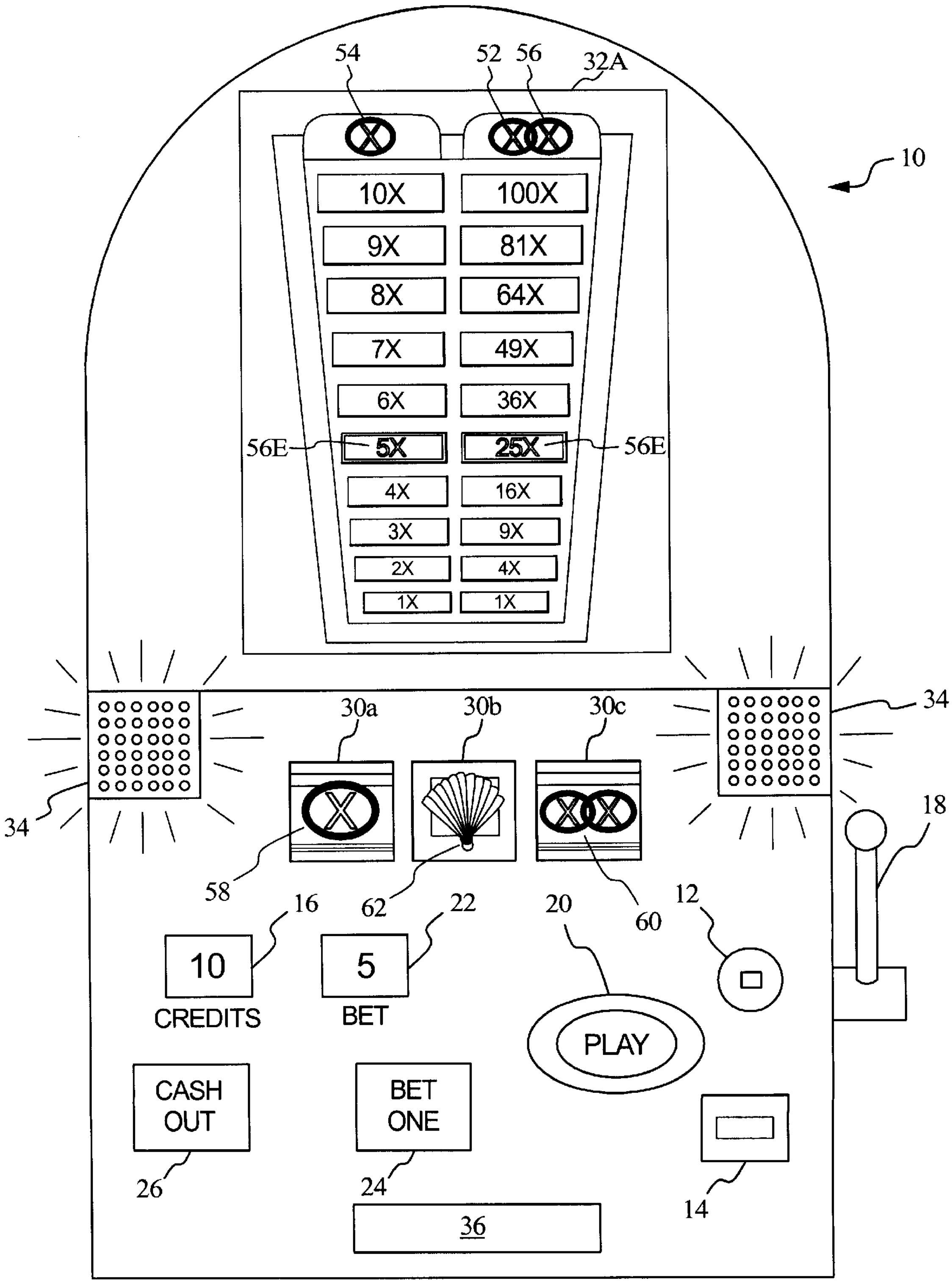
FIG. 6 is a front elevation view of one embodiment of the gaming device having a display of the present invention and a set of reels displaying activators of the present invention.

Referring to FIG. 6, one embodiment of the present invention is shown wherein the modifier display 32*a* of FIG. 5 is displayed on the video monitor 32 of FIG. 1. The modifier display 32*a* is preferably simulated, however, the display could also be mechanical and have a mechanical indicator or dial that points to the currently designated modifier. The present invention also contemplates a single video monitor that contains both the paystop display 28 and the modifier display 32*a*. For the sake of illustration, the present embodiment is described using separate stop and modifier displays.

Activators

Referring to FIG. 4 and to the embodiment of FIG. 6, upon a random generation of the reels 30 and a display of one or more symbols of the reels on the paystop display 28, as indicated by block 106, the game determines whether an activator symbol or set of symbols appears on a payline of the paystop display 28, which associates with and activates a designated modifier from the group 54. If not, then the present invention makes the same determination for the designated modifier from the group 56. If the embodiment contains three designated modifiers, the game determines if an activator associated with the third modifier has appeared and so on until the present invention determines for each modifier whether the reels display an activator on a payline of the gaming device. The order in which the present invention makes the determination for each designated modifier is not important.

An activator is preferably a symbol or combination of symbols. Each modifier has an associated activator, and one activator can activate more than one designated modifier. For example, the preferred embodiment includes an activator for each group of modifiers, wherein the activator activates each group's designated modifier. The symbol or symbols comprising the activators preferably relate to a theme presented by the modifier display 32*a*. Referring to FIG. 6, the reel 30*a* contains an "X" activator 58 that activates the designated "X" modifier of the group 54 and a "XX" activator 60 that activates the designated "XX" modifier of the group 56. In this embodiment, a single symbol activates the modifier, however, the present invention could require a combination, such as both the "X" symbol of activator 58 and the "XX" symbol of activator 60 to activate the designated modifier.

Referring still to FIGS. 4 and 6, if either of the predefined activators appear on a payline as indicated by diamonds 108 and 112, the game modifies a number of base game credits using the designated modifiers shown in the display 32*a* as indicated in blocks 110 and 114, respectively. For example, if the "X" activator 58 appears on the payline, the present invention modifies a number of base game credits using the designated "X" modifier 54*e* of 5X as shown. If the "XX" activator 60 appears on the payline, the game modifies a number of base game credits using the designated "XX" modifier 56*e* of 25X as shown.

The number of base game credits acted upon or modified are either the amount of a player's wager, shown in the bet display 22, or an amount that a player would otherwise win, i.e., a payout, from a winning symbol or combination of symbols displayed on the reels 30. The game preferably employs one or the other base game credits in conjunction with the modifiers and does not vary or switch from a bet to a payout or vice versa during the gaming device operation.

Referring to FIG. 6, the gaming device displays in the bet display 22 that the player has wagered five credits. If the number of base game credits of the present example is the player's bet, the player receives the "X" activator 58 upon random generation of the reels, the designated "X" modifier is 54*e* or 5X, and the modifier functions to multiply the value by the credits, then the game of the present invention awards the player 25 credits (5×5) for receiving the "X" activator. It should be appreciated that substituting the receipt of the "XX" activator 60 in the above example would yield an award of 125 (5×25) credits to the player.

Alternatively, if the number of base game credits of the present example is a payout from a symbol or a winning combination of symbols, the receipt of an activator does not automatically signal an additional award. In this alternative, the player must also receive a winning combination. For example, if the oriental fan symbol 62 displayed on reel 30*b* of FIG. 6 did not alone or in combination with the "X" or the "XX" symbols yield an award, then the receipt of either of the activators 58 or 60 would have no effect. However, if the receipt of the oriental fan symbol 62 alone yielded a payout of ten gaming device credits, the receipt of the "X" activator 58 would boost the award to 50 credits (10×5) in the current example, while the receipt of the "XX" activator 60 would boost the award to 250 credits (10×25). Preferably, if both "X" and "XX" activators are obtained, only the highest of the activators is used; however, the game could use both activators such that in the example the award would be 1250 credits (10×5×25).

The gaming device of the present invention preferably predetermines at least some of the payout generating winning combinations of the reels 30 to include one or more of the activators, so that the receipt of an activator has an effect on the outcome of an award. For example, the present invention can make a winning combination of symbols be the oriental fan 62 and the "XX" activator 60, or the fan, the "X" activator and the "XX" activator, etc.

Referring again to FIGS. 4 and 6, after modifying game credits upon the receipt of an activator symbol as indicated by blocks 110 and 114, the game resets or randomly regenerates a new designated modifier as indicated by block 104. Random regeneration preferably occurs upon the modification of a number of base game credits. If the number of credits is the player's wager, the random regeneration automatically occurs upon the receipt of an activator. When the credits acted upon are generated by a winning combination, the present invention preferably regenerates upon the receipt of a winning combination and an activator. Alternatively, the present invention regenerates merely upon the receipt of an activator.

The present invention preferably employs a weighted system in randomly regenerating newly designated modifiers, so that it is more likely that the game will designate a lower value modifier to the player, but not the lowest value. For example, there can be a 5% chance that the player begins with a designated "X" modifier of 1X, a 20% chance of 2X, a 25% chance of 3X, a 16% chance of 4X, an 10% chance of 5X, an 8% chance of 6X, a 6% chance of 7X, a 5% chance of 8X, a 3% chance of 9X and a 2% chance of 10X. It is preferably conceivable, yet unlikely, that a player would obtain an initial 1X, 7X, 8X, 9X or 10X. To increase enjoyment and excitement, the present invention preferably entices the player with a designated multiplier greater than one and provides a challenge to the player to achieve the maximum multiplier.

Incrementor

Figure 7:
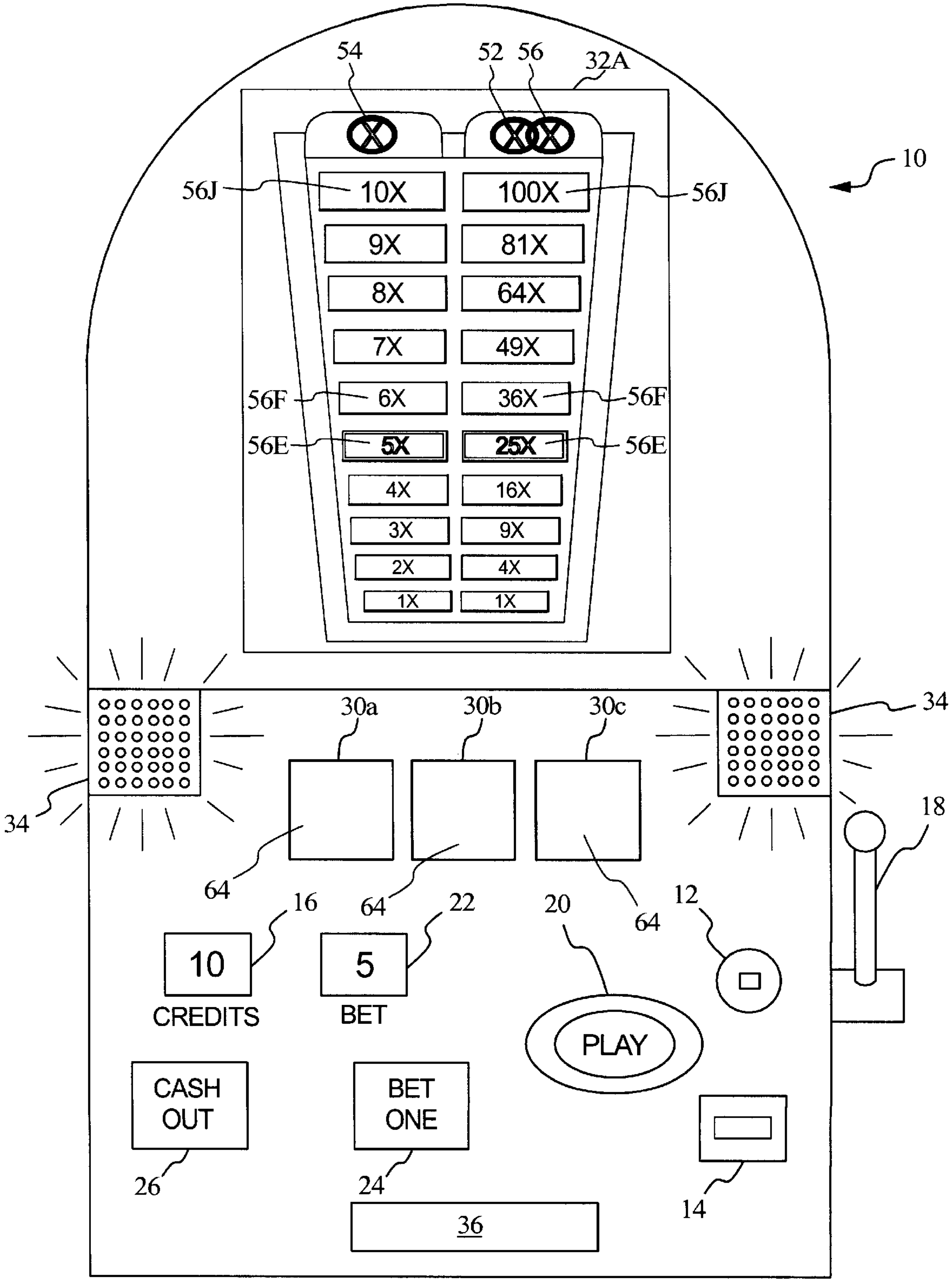
FIG. 7 is a front elevation view of one embodiment of the gaming device having a display of the present invention and a set of reels displaying incrementors of the present invention. de

Referring to diamond 116 of FIG. 4 and to another example of the present invention in FIG. 7, wherein the player does not receive an activator for any modifier as indicated in diamonds 108 and 112, the game then determines whether the player has received an incrementor. The incrementor is preferably a combination of symbols although the incrementor can also be a single symbol. In one embodiment, each modifier has its own associated incrementor. In another embodiment, one incrementor re-designates more than one modifier. The gaming device preferably re-designates the modifier to the next highest modifier. If a modifier group exists, the incrementor preferably re-designates the modifier to the next highest modifier within the group.

Referring to FIG. 7, the combination of symbols on a payline of the reels 30*a,* 30*b* and 30*c* that produces an incrementor is a ghost symbol on each reel, or a blank, blank, blank, respectively. In this embodiment, all three reels of a payline must display the ghost symbol. In other embodiments a single ghost or two ghost symbols comprise an incrementor. It should be appreciated that the present invention can use any symbol or combination of symbols to represent an incrementor and is not limited to the ghost symbol.

In the embodiment of FIG. 7, when the player spins the reels and randomly generates an incrementor 64 on a payline (i.e., the three ghost combination as shown on paystop display 28), the game determines, as indicated in diamond 118 of FIG. 4, whether the designated modifiers are the maximum modifiers available in a group. That is, the bonus game determines whether it can increase the designated modifiers. If the values can be increased, the game re-designates the modifiers of the groups 54 and 56 one level or to the next highest modifier as indicated by block 120.

In this example, the receipt of the incrementor 64 causes the bonus game to re-designate both the "X" modifier of the group 54 and the "XX" modifier of the group 56, however, the present invention contemplates the receipt of the incrementor 64 re-designating less than all the modifiers. In the modifier display 32*a* of FIG. 6, since the currently designated modifiers 54*e* and 56*e* (5X and 25X) are less than the maximum modifiers 54*j* and 56*j,* respectively, the bonus game re-designates the modifiers to the next highest modifiers, 54*f* and 56*f.*

Referring to FIG. 4, if no activators or incrementors appear on a payline of the reels as indicated in diamonds 108, 112 and 116, the game enables the player to spin again. If the player likewise receives an incrementor but the designated modifiers are already at their maximum, as indicated in diamonds 116 and 118, the game enables the player to spin again. Third, if the player receives an incrementor and the designated modifiers are not already at their maximum, then the present invention changes the modifiers as indicated by block 120, and the bonus game enables the player to spin again as indicated by block 106.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is hereby claimed as follows:

1. A gaming device comprising:

a controller;

a plurality of modifiers;

a display connected to the controller which designates at least one of said modifiers to a player;

a plurality of reels connected to said controller;

at least one activator on said reels which causes the designated modifier to change player's award when said player obtains said activator; and at least one incrementor on said reels which directly causes the designated modifier to change when said player obtains said incrementor.

2. The gaming device of claim 1, wherein said incrementor is a combination of symbols on said plurality of reels.

3. The gaming device of claim 1, wherein said incrementor is a single symbol on said reels.

4. The gaming device of claim 1, wherein said activator is a single symbol on said reels.

5. The gaming device of claim 1, wherein said display simultaneously displays each of said modifiers.

6. The gaming device of claim 5, wherein said display includes means for illuminating said designated modifier.

7. The gaming device of claim 5, wherein said modifiers range from relatively low modifiers to relatively high modifiers.

8. The gaming device of claim 1, wherein said player's award is an award from winning a base game of said gaming device.

9. The gaming device of claim 1, wherein said player's award is an amount of a player's wager.

10. The gaming device of claim 1, wherein said modifiers are multipliers.

11. The gaming device of claim 1, which includes a plurality of incrementors on at least one reel.

12. The gaming device of claim 1, which includes a plurality of activators on at least one reel.

13. The gaming device of claim 1, wherein one of the modifiers is randomly re-designated after said player obtains an activator and the previously designated modifier changes said player's award.

14. A method for operating a gaming device, said method comprising the steps of:

(a) designating a modifier from a plurality of modifiers;

(b) enabling a player to play a base game of said gaming device;

(c) determining if said player obtains an activator in said base game;

(d) modifying a number of base game credits provided to said player based on said designated modifier if said player obtains said activator;

(e) determining if said player obtains an incrementor in said base game; and (f) directly changing the designated modifier if said player obtains an incrementor.

15. The method of claim 14, wherein determining if said player obtains an incrementor includes determining if a particular symbol appears on a reel of said gaming device.

16. The method of claim 14, wherein determining if said player obtains an incrementor includes determining if a particular combination of symbols appears on a payline of said gaming device.

17. The method of claim 14, wherein determining if said player obtains an activator includes determining if a particular symbol appears on a payline of said gaming device.

18. The method of claim 14, wherein determining if said player obtains an activator includes determining if a particular combination of symbols appears on a payline of said gaming device.

19. The method of claim 14, wherein modifying a number of base game credits includes modifying in player'bet.

20. The method of claim 14, wherein modifying a number of base game credits includes modifying an award from a base game win.

21. The method of claim 14, which includes the step of displaying said plurality of modifiers on a modifier display.

22. The method of claim 21, which includes the step of illuminating said designated modifier on said modifier display.

23. The method of claim which includes the step of using audio signals to indicate said designated modifier.

24. The method of claim 14, which includes the step of randomly re-designating one of the modifiers from said plurality of modifiers after a player obtains an activator and the designated modifier changes the player's award.

25. The gaming device of claim 24, which includes a weighted probability associated with the modifiers for randomly re-designating one of the modifiers.

26. The gaming device of claim 14, which includes two groups of modifiers and separate activators associated with each group of modifiers, wherein a designated modifier from one of the groups changes the player's award when the player obtains an activator associated with the group.

27. A gaming device comprising:

a display device;

a processor in communication with the display device;

a plurality of modifiers which are displayed by the display device, wherein at least one of said modifiers are designated by the display device to a player;

a primary game controlled by the processor and adapted to be played by the player;

at least one activator in the primary game which causes the designated modifier to change an award provided to the player when said player obtains said activator; and at least one incrementor in the primary game which directly causes the designated modifier to change when the player obtains said incrementor in the primary game.

28. A gaming device comprising:

a plurality of modifiers which range from a low modifier to a high modifier;

a display which simultaneously displays said range of modifiers and designates one of said modifiers to a player;

a plurality of reels;

at least one activator on said reels, wherein the designated modifier changes the player's award when the player obtains said activator;

at least one incrementor on said reels that changes the designated modifier to a higher modifier when the player obtains said incrementor on said reels; and a processor which controls said display and said reels.

29. A gaming device comprising:

a plurality of award modifiers;

an award modifier display which simultaneously displays said award modifiers and which designates one of said award modifiers to a player;

a plurality of reels;

a processor which communicates with said award modifier display and said reels;

an activator on at least one reel, wherein said designated modifier changes a player's award when said player obtains said activator; and an incrementor on at least one reel that changes said designated modifier when said player obtains said incrementor.

30. The gaming device of claim 29, wherein said incrementor is a combination of symbols simultaneously displayed on said reels.

31. The gaming device of claim 29, wherein said incrementor is a single symbol on said reels.

32. The gaming device of claim 29, wherein said activator is a single symbol on said reels.

33. The gaming device of claim 29, wherein said award modifier display includes means for illuminating said designated modifier.

34. The gaming device of claim wherein said modifiers range from low value modifiers to high value modifiers.

35. The gaming device of claim 29, wherein said player's award is an award from winning a base game of said gaming device.

36. The gaming device of claim 29, wherein said player's award is an amount of a player's wager.

37. The gaming device of claim 29, wherein said modifiers are multipliers.

38. A gaming device comprising:

a plurality of award modifiers;

an award modifier display which simultaneously displays said plurality of award modifiers and which designates one of said award modifiers to a player;

a primary game adapted to be played by the player;

a processor which communicates with said award modifier display and controls the primary game;

an activator in said primary game, wherein said designated modifier changes a player's award in the primary game when said player obtains said activator; and an incrementor in the primary game which changes said designated modifier when said player obtains said incrementor.

* * * * *

UNITED STATES PATENT AND TRADEMARK OFFICE

CERTIFICATE OF CORRECTION

PATENT NO. : 6,328,649 B1 Page 1 of 1
DATED : December 11, 2001
INVENTOR(S) : Randall et al.

It is certified that error appears in the above-identified patent and that said Letters Patent is hereby corrected as shown below:

Column 9,
Line 59, change "an 10% chance" to -- a 10% chance --.
Line 60, change "an 8% chance" to -- a 8% chance --.

Column 12,
Line 6, change "modifying in" to -- modifying a --.
Line 6, change "player' bet" to -- player's bet --.
Line 15, change "claim which" to -- claim 21, which --.
Line 21, change "gaming device of" to -- method of --.
Line 24, change "gaming device of" to -- method of --.

Column 13,
Line 17, change "claim wherein" to -- claim 29, wherein --.

Signed and Sealed this

Third Day of December, 2002

JAMES E. ROGAN
*Director of the United States Patent and Trademark Office*